(12) United States Patent
Rosenbaum et al.

(10) Patent No.: US 6,901,151 B1
(45) Date of Patent: May 31, 2005

(54) METHOD AND DEVICE FOR PROCESSING MAIL TO BE RETURNED TO SENDER

(75) Inventors: Walter Rosenbaum, Paris (FR); Frank Pfeiffer, Constance (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/762,896
(22) PCT Filed: Apr. 29, 1999
(86) PCT No.: PCT/DE99/01261
§ 371 (c)(1),
(2), (4) Date: Aug. 9, 2001
(87) PCT Pub. No.: WO00/10113
PCT Pub. Date: Feb. 24, 2000

(30) Foreign Application Priority Data

Aug. 13, 1998 (DE) .......................... 198 36 767

(51) Int. Cl.[7] ................................................ G06K 9/00
(52) U.S. Cl. ........................................ 382/101; 209/584
(58) Field of Search ............................ 382/101; 209/584

(56) References Cited

U.S. PATENT DOCUMENTS

| 4,809,340 A | * | 2/1989 | Mersereau ................ 382/101 |
| 5,315,668 A | | 5/1994 | O'Hair |
| 5,581,628 A | * | 12/1996 | Nakamura et al. .......... 382/101 |
| 5,697,504 A | | 12/1997 | Hiramatsu et al. |
| 6,269,171 B1 | * | 7/2001 | Gozzo et al. ............... 382/101 |
| 2003/0189090 A1 | * | 10/2003 | Holden ....................... 235/375 |

FOREIGN PATENT DOCUMENTS

| DE | 39 38 627 | 5/1990 |
| DE | 196 44 163 | 5/1998 |

OTHER PUBLICATIONS

Yunlong Sheng et al, "Invariant Pattern Recognition Using Fourier–Mellin Transforms and Neural Networks", Journal of Optics, vol. 22, No. 5, Sep. 1, 1991, pp. 223–228.

* cited by examiner

Primary Examiner—Andrew W. Johns
Assistant Examiner—Hussein Akhavannik
(74) Attorney, Agent, or Firm—Siemens AG; J. Eisenberg

(57) ABSTRACT

The present invention relates to a method for processing mail to be returned to sender, according to which the extent of video-coding required when great quantities of mail sent by large mailers are to be returned to sender is reduced considerably. According to the invention similarities in the areas containing the senders' addresses are determined at the image level. In the case of mail where the address field images present a defined degree of similarity only one image is video-coded. The remaining mail displaying a defined degree of similarity to the video-coded item of mail is assigned to the corresponding sender.

6 Claims, 2 Drawing Sheets

METHOD AND DEVICE FOR PROCESSING MAIL TO BE RETURNED TO SENDER

BACKGROUND OF THE INVENTION

The invention relates to a method and a device for processing mail items to be returned to sender, in accordance with the preamble to the independent claims.

Returning mail items to the sender is necessary if the mail item cannot be delivered to the recipient and cannot be forwarded, for example because the new address is not known or the sender has provided instructions that the mail item be returned to sender if undeliverable.

The detection of a mail item that must be returned to sender is known from prior art. If the recipient is not known at the address provided and a new address is not available, the mail item will be provided by the delivery person with an automatically recognized return stamp. If the mail item contains an instruction, "do not forward, return to sender," the return stamp is affixed immediately and without first checking a forwarding data file. If a return instruction is recognized during the automatic processing by the OCR reader and if the process of learning the recipient address, including the address interpretation, shows that the recipient is not known under the address provided, then this mail item is placed in the category of mail items to be returned to sender. The same applies if a return stamp is recognized.

The number of mail items to be returned to sender constantly increases and this service by the Post Office helps large-volume customers, for example mail-order houses, to update their address lists.

At first glance, it appears that this problem is easier to solve automatically than the forwarding since the return address is legibly affixed to the mail item and a special search of a data bank is not necessary, as is the case for the forwarding. Practical operations have shown, however, that the OCR reader can clearly recognize sender data with much less frequency, so that a video-coding becomes necessary. The reasons for this are as follows:

1. The localization of sender data on the mail item is above all based on aesthetic aspects, which differ for each sender.
2. Large-volume customers in particular use special logos, specific lettering styles (such as bound handwriting), among other things for advertising purposes as registered trademarks. Automatic OCR readers can clearly identify only a small number of these.
3. Additional data is frequently provided as well, such as a telephone number or a fax number, which leads to non-recognition/rejection by the evaluation algorithms developed for the address recognition.

In order to achieve the most far-reaching online processing of mail items to be forwarded, including mail items to be returned, German Patent Application 196 44 163 A1 describes a method for the prioritized processing of mail items to be forwarded during the video-coding. However, this prioritized processing cannot be used to solve the above-described problem for the case of large-volume customers where numerous mail items, containing sender addresses that are hard to read by machine, must be returned to sender.

SUMMARY OF THE INVENTION

Thus, it is the object of the invention as stated in the claims to create a method and a device for processing mail items to be returned to sender. Said method and device are designed to strongly reduce the video-coding expenditure for the numerous mail items from large-volume customers that must be returned to sender, for example a mail-order house, thereby making it possible to have online processing.

Since every large-volume customer uses a uniform design for its sender data on the numerous mail items, the invention starts with the idea of automatically comparing the sender data on the image level, so as to detect similarities. Starting with a specific degree of similarity, these mail items are then assigned to a single sender. Once they are assigned, it is only necessary to videocode a single one of these mail items with respect to the sender data. Thus, the time-consuming manual expenditure can be reduced strongly and the numerous mail items to be returned to large-volume customers can be processed online (sorted), even though an automatic OCR reading of the sender data is not possible. The most favorable way to realize this is by immediately video-coding the return mail items with sender data that cannot be read automatically and which do not have defined similarities to the images of sender regions of previously video-coded mail items. The results are then stored together, so that they can be compared to the following mail items to be returned and mail items with similar images of the sender regions can be assigned to the coded sender.

Of course, it is also possible to first examine the mail items to be returned on the image level to detect similarities in the sender data, to sort them according to the similarities and subsequently videocode only one mail item from each stack of mail items.

Advantageous embodiments of the invention are shown in the dependent claims.

BRIEF DESCRIPTION OF THE DRAWINGS

The invention is explained in further detail in the following, with the aid of one exemplary embodiment and the drawings.
Shown are in.

DETAIL DESCRIPTION OF THE INVENTION

The decision to "return to sender" can be made for different reasons:

1. The mail item contains an instruction by the sender in the form of a printed-on message: "If not deliverable, return to sender." If it is determined during the address interpretation that the recipient is not listed in the respective address data file under the address provided, the decision is made to return the mail item.
2. Following detection and coding of the recipient address, the delivery person determines that the recipient does not reside at the given address and no forwarding instructions are available or the recipient refuses to accept the mail item. In those cases, the delivery person affixes a return stamp to the recipient address region. If the mail item additionally contains sender instructions for returning the mail item, no check is made to determine whether the recipient has moved and/or whether a forwarding instruction exists.

Figure 1:
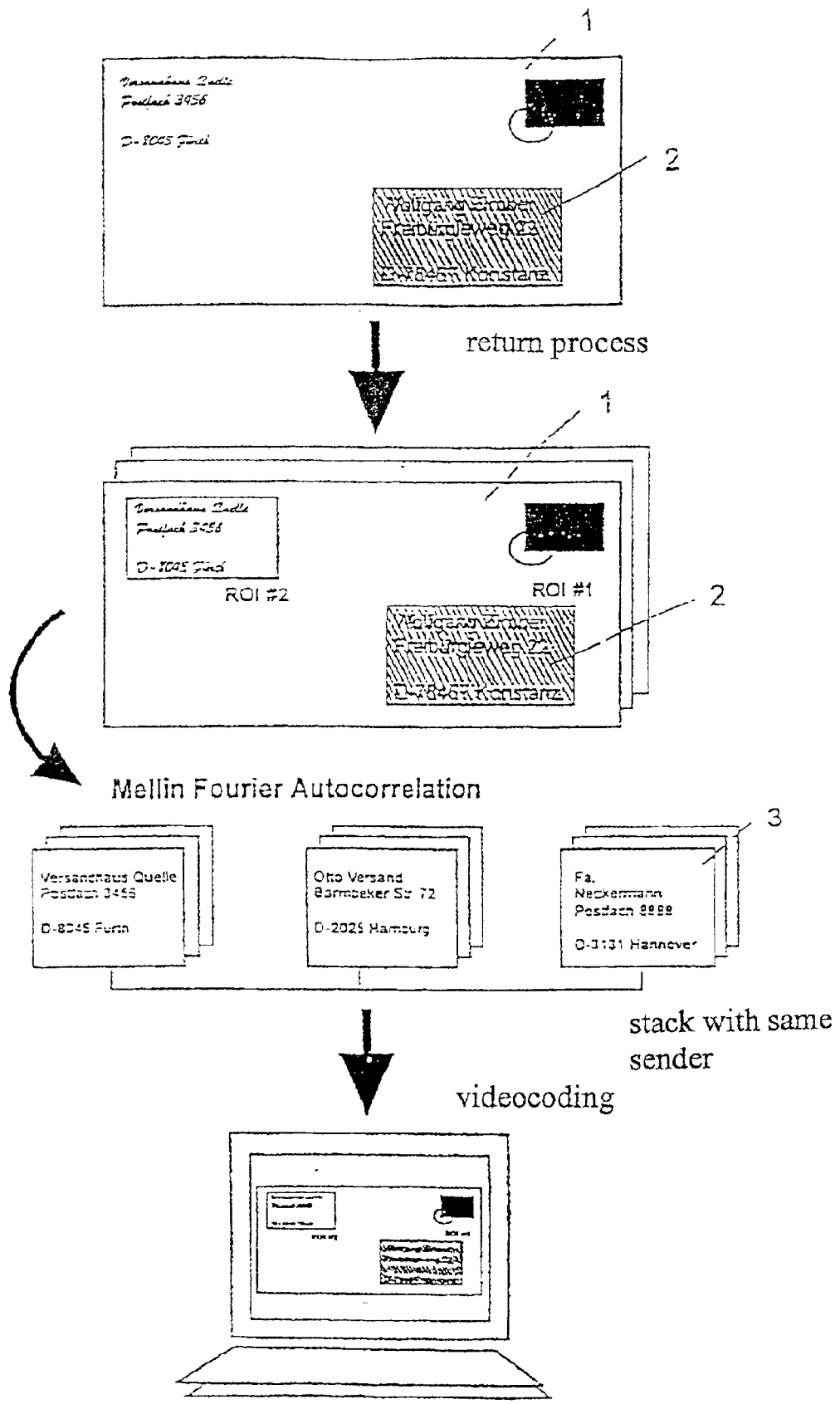
FIG. 1 A schematic sequence for processing mail items that must be returned to sender.

FIG. 1 shows as example a mail item 1 from the "Quelle" mail-order house, which could not be delivered to the recipient and therefore was stamped with a return stamp 2 by the delivery person. During the return process, this mail item 1 is included in the distribution process in the same way as a new mail item. First of all, an image of the mail item surface is recorded, regions of interest are determined and these regions are then classified. The region with recipient data ROI 1 and the return stamp 2 in this region are then determined for the above case. As a result of the return decision, the region with sender data ROI 2 is compared on the image level to the stored images of the recipient regions ROI 2 of previously processed mail items to be returned, so as to determine the similarities.

Image processing and detection methods that are known per se are used for this. Corresponding methods are disclosed in further detail in:

1. P. Suda et al: Logo and Word Matching. Using a General Approach to Signal Registration, 4$^{th}$ International Conference of Document Analysis and Recognition (ICDAR), Ulm, 1997.
2. A. Rosenfeld and A. Katz: Digital Picture Processing. Academic, chapter 8.3, New York, 1976.
3. Robert J. Schalkoff: Digital Image Processing and Computer Vision, John Wiley & Sons, 1989.

Particularly advantageous is the combination of Mellin-Fourier Transformation during the auto-correlation, the "Mellin-Fourier-Autocorrelation" (see Item 3, pages 281–286), because it concerns a general, systematic approach, which can be adapted and expanded easily.

The mail items to be returned to sender, for which the sender region images have agreed-upon degrees of similarity based on the Mellin-Fourier-Autocorrelation, are subsequently combined into respective mail item stacks 3. At the end of a day, for example, only the sender address region of one mail item is video-coded from each mail item stack while the remaining mail items in this stack are then assigned to the detected and coded sender address and are sorted for delivery to this address.

Figure 2:
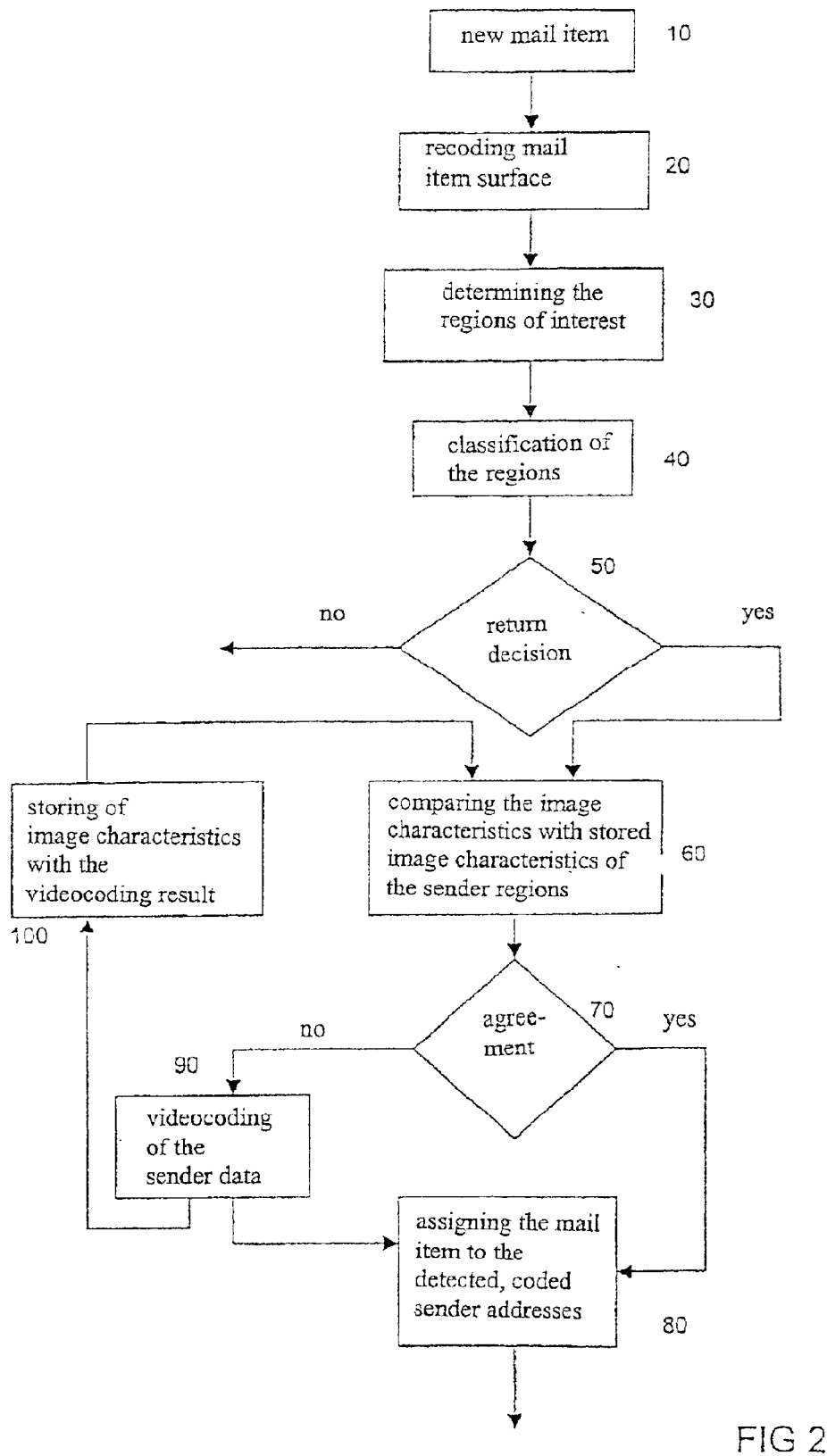
FIG. 2 A flow chart for a mostly online processing of mail items returned to sender.

The sequence of steps shown in FIG. 2 is particularly advantageous for achieving the highest possible online processing rate.

The arriving mail items that are loaded into a sorting machine are first of all separated. In a reading device, the item surfaces with distribution data of the respectively separated, new mail items 10 are scanned 20 and the regions of interest ROI 30 are identified. These regions 40 are subsequently classified to determine the recipient region, the sender region, the stamp region, the region with sender instructions and the return stamp region. Subsequently, the decision 50 for returning the mail item is made. If the mail item is to be returned, image characteristics of the region are compared to the sender data with stored image characteristics to detect similarities, for example by means of the Mellin-Fourier-Autocorrelation 60. If no similarities exist to the agreed-upon degree 70, or if no image characteristics have been stored 100, then the image of the sender region is video-coded 90 and the coding result is stored 100 together with the image characteristics. The respective mail item is then assigned to the video-coding result 80 and thus can be distributed to the sender. If, during the characteristic comparison 70, the agreed-upon similarity with the stored image characteristics of a previously video-coded mail item is detected, then the new mail item is assigned to the coded sender address without additional video-coding. It is particularly advantageous if the regions containing the sender data of known large-volume customers are videocoded prior to processing the mail items. The results with the characteristics of the images of these regions, used for the similarity analysis, are then stored in a return data file, which is constantly updated during the course of the processing of mail items to be returned to sender.

What is claimed is:

1. A method of processing mail items to be returned to sender by scanning and storing the images of the mail item surfaces provided with distribution data and identifying at least the regions containing the sender address, characterized in that similarities are identified for the image regions containing the sender address, that of the mail items showing a predetermined degree of similarity for the images of address regions, only one mail item is video-coded while remaining maim items are assigned to an identified sender.

2. A method according to claim 1, characterized in that the similarities of the sender address images determined with the Mellin-Fourier-Autocorrelation.

3. A method according to claim 1, characterized in that the regions containing sender data of mail items from large-volume customers are video-coded prior to processing the mail items and are stored in a return data file, together with characteristics determined for associated images and used for the similarity analysis, which returns data file is updated during the processing of mail items to be returned to sender.

4. A method according to claim 1, characterized in that each mail item to be returned to sender, for which the sender address cannot be read clearly automatically, is checked to determine whether image characteristics used for the similarity analysis of the region containing sender data exhibit the predetermined degree of similarity with stored image characteristics of the region containing the sender data of a mail item with previously video-coded sender address and that if this degree of similarity exists, the mail item is assigned to the previously video-coded sender address and that if the predetermined degree of similarity does not exist, the mail item is then video-coded and the characteristics of the image of the region with the sender data are stored together with the result of the video-coding.

5. A method according to claim 1, for which the mail items are provided with (ID) flags and the images of the mail items are stored under the associated ID flags, characterized in that characteristics of the sender data region that are used for the similarity analysis are stored together with the result of the video-coding under the respective ID flags.

6. A system for processing mail items to be returned to sender, comprising a device for generating and storing mail item images, an OCR reader for the automatic evaluation of the identification of the regions of interest, including sender address, recipient address, return to sender instructions or return stamp, with the aid of the stored images, and for running a result check in a name/address data bank and a return data file, further comprising a device for video-coding the images or the regions of interest on mail items with result checks, said device having at least one video-coding station, one image controller for controlling the data flow between the OCR reader and the device for video-coding, which supplies the corresponding mail item images or only the respective sender address regions to the video-coding device if sender addresses cannot be read clearly, and which feeds the video-coding results to the OCR reader so that they can be stored together with the associated image, characterized in that the OCR reader is provided with a device for determining similarities between images, which device contains images of the sender addresses on the identified mail items that are to be returned to sender, that when detecting a fixed degree of similarity between stored images characteristics of the region with sender data of previously video-coded mail items and image characteristics of a new mail item, the new mail item is assigned to the coding results of the previously video-coded mail item and, if the predetermined degree of similarity is not reached, the respective image of the sender address of the new mail item is supplied via the image controller to the device for video-coding and the coding result is transferred to the OCR reader for storage together with the image characteristics of the sender address image, which are used for the similarity analysis.

* * * * *